(12) United States Patent
Ludwigsson et al.

(10) Patent No.: US 12,292,030 B2
(45) Date of Patent: May 6, 2025

(54) FLOATING WIND SEMI-SUBMERSIBLE WITH T-SHAPED PONTOON

(71) Applicant: BASSOE TECHNOLOGY AB, Gothenburg (SE)

(72) Inventors: Robert Ludwigsson, Gothenburg (SE); Markus Norberg, Storvreta (SE); Yungang Liu, Partille (SE)

(73) Assignee: BASSOE TECHNOLOGY AB, Gothenburg (SE)

( * ) Notice: Subject to any disclaimer, the term of this patent is extended or adjusted under 35 U.S.C. 154(b) by 56 days.

(21) Appl. No.: 17/921,908

(22) PCT Filed: Apr. 29, 2021

(86) PCT No.: PCT/EP2021/061265
§ 371 (c)(1),
(2) Date: Oct. 27, 2022

(87) PCT Pub. No.: WO2021/219787
PCT Pub. Date: Nov. 4, 2021

(65) Prior Publication Data
US 2023/0160368 A1    May 25, 2023

(30) Foreign Application Priority Data

Apr. 30, 2020    (SE) .................................. 2030148-7

(51) Int. Cl.
*F03D 13/25*    (2016.01)
*B63B 1/10*    (2006.01)
(Continued)

(52) U.S. Cl.
CPC .............. *F03D 13/25* (2016.05); *B63B 1/107* (2013.01); *B63B 1/125* (2013.01);
(Continued)

(58) Field of Classification Search
CPC ........ F03D 13/25; F03D 13/40; F03D 13/256; B63B 1/107; B63B 1/125;
(Continued)

(56) References Cited

U.S. PATENT DOCUMENTS

| | | |
|---|---|---|
| 4,436,050 A | 3/1984 | Liden |
| 4,498,412 A | 2/1985 | Liden |

(Continued)

FOREIGN PATENT DOCUMENTS

| | | |
|---|---|---|
| CN | 107539433 A | 1/2018 |
| CN | 107683371 A | 2/2018 |

(Continued)

OTHER PUBLICATIONS

Office Action in corresponding Chinese patent application No. 2021104771253, dated Jan. 13, 2024.

(Continued)

*Primary Examiner* — Joseph Ortega
(74) *Attorney, Agent, or Firm* — MARSHALL, GERSTEIN & BORUN LLP

(57) ABSTRACT

A moored floating offshore wind semi-submersible platform with at least three columns characterized in that columns are supported on a T-shaped underwater hull made up of two elongated pontoons, where one pontoon is perpendicular to the other pontoon and a method that allow that the semi-submersible platform is constructed in hull-assemblies and blocks at a first location, transported efficiently to a second location close to the final offshore location where the hull-assemblies and blocks may be assembled quay-side while floating in the water. The platform will support at least one wind turbine on a supporting structure (tower) but may also support two turbines and in the latter case the platform will be moored offshore with a mooring turret to allow the platform to align in a favourable direction to the wind.

21 Claims, 13 Drawing Sheets

(51) Int. Cl.
  *B63B 1/12* (2006.01)
  *B63B 35/44* (2006.01)

(52) U.S. Cl.
  CPC ... *B63B 2001/126* (2013.01); *B63B 2001/128* (2013.01); *B63B 2035/446* (2013.01)

(58) Field of Classification Search
  CPC ........ B63B 2001/126; B63B 2001/128; B63B 2035/446; B63B 21/507; B63B 35/44; B63B 75/00; B63B 2035/442; Y02E 10/72; Y02E 10/727
  See application file for complete search history.

(56) References Cited

U.S. PATENT DOCUMENTS

| | | |
|---|---|---|
| 4,823,719 A | 4/1989 | Sarwe |
| 5,197,825 A | 3/1993 | Rasmussen |
| 6,015,245 A | 1/2000 | Frimm |
| 6,443,659 B1 | 9/2002 | Patout |
| 6,701,861 B2 | 3/2004 | Key et al. |
| 9,446,822 B2 | 9/2016 | Roddier et al. |
| 2019/0143282 A1 | 5/2019 | Medoff et al. |

FOREIGN PATENT DOCUMENTS

| | | | |
|---|---|---|---|
| CN | 107738730 A | | 2/2018 |
| CN | 110886684 A | | 3/2020 |
| EP | 2789847 A1 | | 10/2014 |
| EP | 3546337 A1 | * | 10/2019 ............ B63B 1/107 |
| FR | 2866312 A1 | | 8/2005 |
| FR | 2985550 A1 | | 7/2013 |
| FR | 3052195 A1 | | 12/2017 |
| GB | 2592934 | | 9/2021 |
| KR | 101956032 B1 | | 3/2019 |
| NL | 2005054 C2 | | 1/2012 |
| NL | 2010709 C2 | | 10/2014 |
| NO | 159362 B | | 9/1988 |
| NO | 160249 B | | 12/1988 |
| NO | 330058 B1 | | 2/2011 |
| NO | 334535 B1 | | 3/2014 |
| NO | 340022 B1 | | 2/2017 |
| SE | 7411764 L | | 3/1976 |
| SE | 431316 B | | 1/1984 |
| SE | 439913 B | | 7/1985 |
| SE | 8700263 L | | 7/1988 |
| SE | 1850064 A1 | | 7/2019 |
| SE | 1850590 A1 | | 7/2019 |
| WO | WO-2006132539 A1 | | 12/2006 |
| WO | WO-2009131826 A2 | | 10/2009 |
| WO | WO-2010110671 A1 | | 9/2010 |
| WO | WO-2014031009 A1 | | 2/2014 |
| WO | WO-2014163501 A1 | | 10/2014 |
| WO | WO-2016138088 A1 | | 9/2016 |
| WO | WO-2017174665 A1 | | 10/2017 |
| WO | WO-2017207937 A1 | | 12/2017 |
| WO | WO-2017220878 A1 | | 12/2017 |
| WO | WO-2018185309 A1 | | 10/2018 |
| WO | WO-2019143282 A1 | | 7/2019 |
| WO | WO-2019143283 A1 | | 7/2019 |

OTHER PUBLICATIONS

Communication pursuant to Article 94(3) EPC in corresponding European application No. 21723677.7, dated Mar. 22, 2024.
International Search Report and Written Opinion for Application No. PCT/EP2021/061265, dated Aug. 13, 2021.
Floating Offshore Wind Foundations: Industry Consortia and Projects in the United States, Europe and Japan, An Overview, May 2013 Update, Main(e) International Consulting LLC.
Experimental validation of the W2Power Hybrid Floating Platform, Pedro Mayorga, EnerOcean S.L., Paper presented at EERA DeepWind 2016, 13th Deep Sea Offshore Wind R&D Conference, Trondheim (Norway), Jan. 20-22, 2016.
Masao Komatsu et al., "Development of Offshore Wind Turbine Floater that Blends into Japanese Waters—Evaluation of the Validity for Design and Applied Methods for V-shaped Semi-submersible Floating structure", *Mitsubishi Heavy Industries Technical Review*, vol. 53, No. 2, Jun. 2016.
TRUSSFLOAT—Marketing video showing construction methodology, Dolfines SAS, Nov. 2017, https://www.youtube.com/watch?v=LggyY0DLKIQ.
Office Action in corresponding Chinese patent application No. 2021104771253, dated Jun. 28, 2024.

* cited by examiner

FLOATING WIND SEMI-SUBMERSIBLE WITH T-SHAPED PONTOON

TECHNICAL FIELD

This invention relates to an offshore semi-submersible platform for harvesting energy from the wind to produce electrical energy and to methods relating to assembly and transport of the same.

BACKGROUND OF THE INVENTION

Semi-submersibles have predominately been used in the offshore oil and gas exploration and production industry. Semi-submersibles for drilling after oil and gas have in most cases been of the two-pontoon type, i.e. having two parallel elongated shaped pontoons supporting multiple columns, due to their mobility between different drilling locations, such as disclosed in SE439,913 [NO159,362 U.S. Pat. No. 4,436,050]. Semi-submersibles for production of oil and gas have in recent years mostly been of the ring-pontoon type due to their superior structural robustness, either with a triangular ring-pontoon, such as disclosed in U.S. Pat. No. 6,701,861, or with a quadrangular/rectangular ring-pontoon, such as disclosed in SE431,316 [NO160,249 U.S. Pat. No. 4,498,412] and U.S. Pat. No. 6,015,245.

Semi-submersibles are known for their favourable motions in harsh wave conditions. However, it's also known from the oil and gas industry that the motion performance of semi-submersibles can be improved by adding suitable sized horizontal plates that increase the added mass and damping, such as disclosed in SE8,700,263 [NO880,277, U.S. Pat. No. 4,823,719].

While semi-submersibles normally are constructed in a floodable dry-dock or on land before they are launched for final outfitting, there are examples of two-pontoon semi-submersibles where the pontoons, in some cases with the lowermost portion of the columns, have been built on a slip-way before being launched and thereafter the (reminder of the) columns, bracings and the deck structure have been erected while the pontoons have been floating in the sea. In such cases, the stability of the semi-submersible during erection has been safeguarded by the joining of the two pontoons before the vertical centre of gravity of the semi-submersible under erection has become too high.

With the increasing demand for renewable energy, offshore wind energy is becoming an important contributor to production of this form of clean electrical energy. With the growth of the offshore wind industry the interest for floating hulls are increasing to meet the larger demand that will require utilization of areas with more favourable wind climate, harsher wave conditions, increased distance from shore, deep waters, etc. However, to make floating wind attractive at such locations the cost for produced energy need to be at an attractive and competitive level, which requires that the cost for hull construction, transport and assembly need to be reduced compared with present cost level.

For floating wind, i.e. wind energy turbine(s) (or other similar devices for transforming wind energy to electric energy, such for example vertical axis turbines) on floating hull, there has been proposed various hull solutions, such as semi-submersibles, Spar's and Tension Leg Platforms (TLP's), see reference [1]. Due to their large draught (almost up to 100 meter), as well as heavy and costly hull, the Spar type floating wind hull, such as exemplified by NO340,022 [WO2006/132,539], is less attractive, possibly with exception for locations where there close to the final offshore location is a very deep near shore location, such as a deep fjord, where the Spar hull may be upended and the wind-turbine may be installed. While the TLP, such as exemplified by SE1850590 [WO2019/143,283], has the advantage of very limited heave, pitch and roll motions, many proposed hull solutions for a TLP is a semi-submersible hull, but with a tendon mooring system, such as exemplified in U.S. Pat. No. 5,197,825, while in other cases the TLP is not stable without its mooring system and therefore need temporary stability and floatation structures during the tow out and installation. Due to their complicated mooring system and the potential requirements for temporary stability and floatation structures during the tow out and installation, the TLP in many cases become relatively costly and less attractive. The disadvantages and cost of the Spar and TLP hull and moorings has made the semisubmersible an attractive solution for floating wind.

Whichever type of hull that is proposed, the towing of an offshore platform with a wind-turbine installed on-board the hull is complicated and challenging due to the forces the turbine and hull may be exposed to in case of harsh weather conditions. It's therefore a preference if the turbine can be erected in a sheltered location relatively close to the final offshore location of the floating wind platform and that the towing-distance and time to the final offshore location is minimized. The hull therefore either need to be constructed in the vicinity of the sheltered location where the wind-turbine shall be erected or have to be transported from the construction yard to the sheltered wind-turbine installation location close to the final offshore location.

The transport from the construction yard of the hull may either be by wet towing, where the hull is floating in the sea, or by dry towing onboard a vessel, which due to the size of the hull normally limit the dry tow to one hull at a time.

There have been proposed a variety of semi-submersibles floating wind hull-configurations with three or more columns. There are three-column types with heave dampening plates where the columns are held together with bracing systems, such as exemplified by the Principle Power Wind-float, U.S. Pat. No. 9,446,822 [WO2009/131,826] and the Dietswell Trussfloat, FR3,052,195 [WO2017/207,937]. There are the type with star-shaped configurations, either with a star-shaped pontoon, such as exemplified by OO-Star, NO334,535 [WO2014/031,009] or with a star shaped deck structure, such as exemplified by the Gusto Tri-Floater, NL2,010,709 [WO2014163501]. Another type with three columns is the Mitsubishi Fukushima semisubmersible with a V-shaped pontoon, see reference [3] and there has also been proposed semi-submersibles with triangular ring-pontoons.

While the above exemplified semi-submersibles are intended for the installation of one wind-turbine on each hull, there have also been proposed semi-submersible hulls for installation of multiple wind-turbines. Semi-submersibles for two wind turbines are exemplified by Enerocean's W2Power of which there has been built one, initially based on NO330,058 [WO2010110671] and later further developed, see reference [2], and by Freia Offshore's Hexicon SE1,850,064 [WO2019/143,282]. Both these two-turbine hulls are three-column semi-submersibles where the columns have heave dampening plates/footings and are held together with bracing systems.

A semi-submersible with two wind turbines may need to be able to weather vane (rotate) to align with the wind direction, such that any of the turbines isn't exposed to the slipstream of the other turbine. The technology to allow a moored floating object to rotate around its mooring system to weather vane is well known from the oil and gas industry where this is used for production ships and may be exemplified by WO2017/174,665.

All the above exemplified semi-submersibles have in common that they either need construction and/or erection of the hull in dry-dock or on land, such as exemplified by reference [3] and [4]. For a semi-submersible where the columns are held together by bracings, the columns will normally not independently float stable in an upright position and further the lower bracings can normally not be attached (for example by welding) to the columns in the sea as the columns are floating too low in the water. Due to the low location and their complicated shape it's normally not possible to utilize the type of welding habitats commonly used when ships shall be joined together in the sea, for example in connection with lengthening operations. An example of a welding habitat used in connection with joining of ship parts is disclosed in SE7,411,764.

Due to the relatively large size of a floating wind semi-submersible hull, there are few dry-docks that can accommodate the floating wind semi-submersible hull, and if built on land, both due to their size and due to their weight, there is required a large and costly semi-submersible dry-tow vessel, such as exemplified in NL2,005,054, a submersible barge or a wide slip-way, to launch the hull. Large floating docks and wide slipways are sparsely available, especially in areas close to potential locations for offshore floating wind installations, hence it may be required to transport the completed hull on a semi-submersible dry-tow vessel to the location for the wind turbine installation close to the final offshore location.

The transport of a floating wind semi-submersible hull on a dry tow vessel is due to the size of the semi-submersible hull normally limited to one hull at a time. Accordingly, and due to the limited number of semi-submersible dry-tow vessels, the cost for transporting a hull to the final location becomes a very large part of the hull cost and one of the factors that limit the competitiveness of a semi-submersible hull for floating wind.

This disclosure focuses on a semi-submersible hull for floating wind that can be constructed in a limited number of parts at a cost effective construction location (shipyard), transported efficiently, for example by allowing parts of multiple hulls be transported on-board one vessel, to a final assembly location where the hull or platform may be assembled in the sea with limited infrastructure in a sheltered location close to the final offshore location.

SUMMARY OF THE INVENTION

The present invention relates to an offshore semi-submersible platform for harvesting energy from the wind to produce electrical energy and a method for construction, transport and assembly of the semi-submersible platform.

More specifically, the present invention introduces a novel way of arranging the underwater hull of a floating wind semi-submersible with the objective to allow that the floating wind semi-submersible platform can be constructed at one location in hull-assembly parts and/or blocks, which may be efficiently transported with multiple platforms onboard one dry tow vessel (or other type of ship/barge or marine vessel) simultaneous to another location, which advantageously is close to the final offshore location, where hull-assembly or platform parts and/or blocks can be assembled in the sea to the complete semi-submersible platform without the need for any special shipyard facilities, such as dry docks, slipways and/or load-out barges.

The object of the present invention is to propose an improved floating wind semi-submersible platform and a method for easy construction, transportation and assembly of the floating wind semi-submersible platform which seeks to mitigate, alleviate and eliminate the above identified challenges/deficiencies in the present art and therefore make the construction, transport and assembly of floating wind semi-submersible platform more cost effective. This will allow that the final assembly of the floating wind semi-submersible platform can take place at a location close to the final offshore installation location, independent from shipyard facilities.

The object of the invention is achieved by means of a floating wind semi-submersible platform apparatus arranged as defined in the independent claim 1 and methods for construction, transport and assembly of the semi-submersible platform according to the corresponding method claims. Various advantageous embodiments, further developments and variants of the invention are set forth by the dependent claims as well as by the following descriptions and the accompanying drawings.

According to the invention, the floating wind semi-submersible platform comprises a submersible hull that is supporting multiple columns, where at least three of the columns are buoyant columns that provide the semi-submersible platform with the required floating stability, and one or more wind energy harvesting devices are arranged on supporting structures, such as for example a wind-turbine on a supporting tower, which are attached one each to the upper end of one of the columns. Further, the underwater hull is made up of two elongated pontoons, where the first pontoon is supporting two of the stabilizing columns in their outer parts while the second pontoon is connected perpendicularly to the first pontoon at about mid-length of the first pontoon and the second pontoon column is supporting the third stabilizing column at its outer part. The result is a submersible underwater hull where the two pontoons in the horizontal plane resemble the letter "T" with one stabilizing column arranged close to each of the three ends of the "T", and with possible additional columns along the "T". The shape of the two pontoons does not have to exactly resemble the T-shape, for instance, the pontoons do not have to be exactly straight and the angle between the two pontoons does not have to be exactly 90°.

According to a further advantageous aspect of the invention, the two pontoons have substantially four-sided cross-sections and are each arranged with two sides, a bottom and a deck. The pontoons may be arranged with rounded corners (bilges) between the sides and the bottom and/or the deck, respectively. According to a further advantageous aspect of the invention, the two pontoons have substantially the same height at their interconnection such that there is a structural alignment between the bottom and deck of the two pontoons. According to a further advantageous aspect of the invention, there are arranged a triangular buoyant structure, having substantially the same height as the pontoons, at each side at the inward end of the second pontoon in the corners to the first pontoon, wherein the triangular structures will act as "structural brackets" and will provide a smooth load transition between the two pontoons.

According to a further advantageous aspect of the invention, the columns that are supported on and interconnected with the T-shaped underwater hull are also interconnected at their upper parts with upper bracings, wherein the upper bracings extends partly into the columns to provide a smooth load transfer between the bracings and the columns. According to a further advantageous aspect of the invention, two lower horizontal bracings interconnect the outer ends of the first and second pontoons, wherein the two lower horizontal bracings are located substantially underneath two of the upper bracings. According to a further advantageous aspect of the invention, said two lower horizontal bracings are arranged at the deck level of the first and second pontoons.

According to a further advantageous aspect of the invention, one or more of the three stabilizing buoyant columns are arranged with internal vertical bulkheads that are aligned in the respective direction of the horizontal bracings and interconnect the upper and lower horizontal bracings, wherein the vertical bulkheads provide an effective load transfer between the bracings and into the columns.

According to one embodiment of the invention, the centre of the three stabilizing buoyant columns are arranged at an approximately equilateral triangle. According to a further embodiment of the invention, the stabilizing buoyant columns have a circular cross section. According to a further embodiment of the invention the outward shell of each of the three stabilizing buoyant columns is extended downwardly to the bottom of the pontoons to form rounded ends of the two pontoons at their outward ends.

According to one embodiment of the invention the width of the first and second pontoon are approximately the diameter of the stabilizing buoyant columns multiplied by square root of three divided by two ($B=D*\sqrt{3}/2$). According to an alternative embodiment of the invention the width of the first pontoon is approximately the diameter of the stabilizing buoyant columns supported on the first pontoon multiplied by square root of three divided by two ($B_1=D_1*\sqrt{3}/2$) while the width of the second pontoon is approximately half the diameter of the stabilizing buoyant column supported on the second pontoon ($B_2=D_2/2$).

According to a further advantageous aspect of the invention, there are arranged added mass and dampening increasing horizontal plates at close to the pontoon bottom at the outer ends of the first pontoon. According to a further advantageous aspect of the invention the added mass and dampening increasing horizontal plates at the first pontoon outer ends are arranged at the same side of the centerline of said first pontoon as the second pontoon and in such a way that the added mass and dampening increasing horizontal plates don't substantially increase the length of the first pontoon. According to a further advantageous aspect of the invention, the added mass and dampening increasing horizontal plates at the first pontoon are arranged at a distance from the second pontoon, or the triangular buoyant structure if applicable, corresponding to at least the width, B, of the second pontoon. According to a further advantageous aspect of the invention, there are arranged added mass and dampening increasing horizontal plates at close to the pontoon bottom at the outer end of the second pontoon.

According to a further advantageous aspect of the invention, the semi-submersible platform is arranged with one wind energy harvesting device arranged on a vertical supporting structure, such as a wind turbine on a supporting tower, on the stabilizing buoyant columns arranged at the outer end of the second pontoon, e.g. at the "bottom of the T", According to one embodiment of the invention the semi-submersible platform is floating and moored with a catenary mooring system, such as an all chain mooring system. According to another embodiment of the invention the semi-submersible platform is floating and moored with a taut-leg mooring system, such as a rope mooring, possibly in combination with chains and/or wires at the end of the ropes.

According to one embodiment of the invention, the semi-submersible platform is tendon moored and the tendons are connected to the sea bed, i.e. the semi-submersible platform is a tension leg platform.

According to a further advantageous aspect of the invention, the semi-submersible platform is arranged with two wind energy harvesting devices that are arranged on supporting structures, such as two wind turbines on a supporting tower each, one at each of the stabilizing buoyant columns arranged at each end of the first pontoon, e.g. at the end of the "roof of the T". According to a further advantageous aspect of the invention, the two supporting structures are inclined outwards in opposite directions substantially parallel to the centerline of said first pontoon, e.g. such as two wind turbine towers that are inclined outwards and parallel with the "roof" of the "T". According to a further advantageous aspect of the invention, the two supporting structures are interconnected at their upper ends with a horizontal bracing.

According to a further advantageous aspect of the invention, the semi-submersible platform with two wind energy harvesting devices are moored with a mooring system that is connected to a turret underneath the hull and the semi-submersible platform may rotate around the turret to align the wind harvesting devices in a favourable angle towards the wind direction, where the mooring system may be a catenary mooring system, a taut leg mooring system or a tendon mooring system. According to a further advantageous aspect of the invention, the turret is arranged underneath the outer end of second pontoon.

An object of the present invention is to make the construction, transport and assembly of floating wind semi-submersible platform more cost effective and allow that the final assembly of the floating wind semi-submersible platform can take place at a location close to the final offshore installation location, independent from shipyard facilities.

According to the invention, this object is achieved by a method for construction, transport and assembly of the semi semi-submersible platform apparatus as per independent claim 1, wherein a first hull-assembly is assembled of the first pontoon, an inner part of the second pontoon and the columns supported and interconnected to the first pontoon. Advantageously the first hull assembly may further include possible triangular buoyant structures at the inward end of the second pontoon and possible upper bracings interconnecting the upper parts of said columns.

A preferred embodiment of the method is that the inner part of the second pontoon has a sufficient length, L, to allow the first hull assembly to float stable in a body of water. This will beneficially lead to that the first hull assembly may be pre-fabricated in a dry-dock or on land at a first location and the first hull-assembly is launched and floating substantially upright and stable in a body of water.

In a further preferred embodiment of the method a second hull-assembly is assembled by joining the first hull-assembly with the outer part of the second pontoon while the first hull-assembly and the outer part of the second pontoon are floating substantially upright and stable in a body of water. This joining of the first hull-assembly and the outer part of the second pontoon to a second hull-assembly may beneficially take place at a second location, distant from the first location.

In a further preferred embodiment of the method the joining the first hull-assembly with the outer part of the second pontoon, to form the second hull-assembly, is carried out by welding, also while floating in a body of water.

The welding of the lower part of the joint may therefore advantageously take place inside a welding habitat arranged around the joint and from which the water has been evacuated. Alternatively, the welding may take place inside a dry dock.

In a further preferred embodiment of the method, the remaining parts of the semi-submersible platform is erected onto the second hull-assembly to complete the semi-submersible platform while the second hull-assembly is floating stable in a body of water. The erection of the remaining parts of the semi-submersible platform onto the second hull-assembly may advantageously be performed by a crane located on a quay while the second hull-assembly is floating alongside the quay.

An advantage with the proposed method is that the first hull-assembly can be constructed in first location and transported to a second location where the second hull-assembly is assembled.

The above method can alternatively be defined as follows: A method for assembling of a semi-submersible platform of the above type, wherein the method comprises: joining a first hull-assembly to an outer part of the second pontoon so as to form a second hull assembly, wherein the first hull-assembly comprises the first pontoon, two of the stabilizing columns and a buoyant inner part of the second pontoon that has a length "L" that is sufficient to allow the first hull-assembly to float substantially stable and upright, and wherein the outer part of the second pontoon is of such dimension that it also floats substantially stable.

In an embodiment the method comprises: prior to joining, positioning the first hull-assembly and the outer part of the second pontoon in a body of water so as to float substantially stable and upright and at substantially the same draught and trim so as to provide for joining.

In an embodiment the method comprises: joining the first hull-assembly to the outer part of the second pontoon by joining the outer part of the second pontoon to the buoyant inner part of the second pontoon.

In an embodiment of the method, the first hull-assembly is joined to the outer part of the second pontoon by means of welding.

In an embodiment of the method, welding of a lower part of the joint takes place inside a welding habitat arranged around the joint and from which the water has been evacuated.

In an embodiment of the method, the second hull-assembly is floating stable in a body of water while the remaining parts of the semi-submersible platform is erected onto the second hull-assembly to complete the semi-submersible platform.

In an embodiment of the method, the first hull-assembly is constructed at a first location and transported to a second location where the second hull-assembly is assembled.

In an embodiment of the method, the first hull-assembly is transported from the first location to the second location onboard a semi-submersible dry-tow vessel and floated on to and off from the semi submersed dry-tow vessel, which is possible since the first hull-assembly is floating stable.

An advantage with the proposed method is that multiple first hull-assemblies can be transported on the same dry-tow vessel and arranged in pairs of two, where the two first hull-assemblies making up a pair are arranged opposite to each other with their respective inner part of the second pontoon pointing towards the other first hull-assembly in the pair and where the inner part of the second pontoons of the respective first hull-assembly pair are arranged side-by-side, which will reduce the space occupied by each pair of first hull-assemblies transported on a dry-tow vessel.

In a further embodiment of the method, the outer part of the second pontoon is supported on top of the first hull-assembly during the transport, which will further reduce the space occupied on a dry-tow vessel. In an advantageous embodiment of the method, the inner part of the second pontoon has a sufficient length, "L", to allow the outer part of the second pontoon to be supported onto the first hull assembly and still allow the first hull-assembly to float stable in a body of water.

The transport of the underwater hulls, which may or may not be provided with the columns during the transport, can, however, be carried out in alternative ways. One alternative is to arrange a not yet assembled hull in a different way than described above. A further alternative is to assemble the underwater hull before the transport. Irrespective of alternative it is generally an advantage to arrange the underwater hulls in pairs on board the marine vessel used for transport to reduce the space required. This allows for the possibility to transport several pairs of underwater hulls on one marine vessel.

The invention thus relates also to a method for transporting at least a first and a second underwater hull of a corresponding first and second semi-submersible platform of the above type from a first location to a second location using a marine vessel, such as a semi-submersible dry-tow vessel, wherein each of the first and second underwater hulls is arranged with its first pontoon extending in a first direction (such as a transversal direction across a longitudinal axis of the marine vessel) and with the second pontoon, or at least a part of the second pontoon connected to the first pontoon, extending in a second direction substantially perpendicular to the first direction (such as substantially in parallel with the longitudinal axis of the marine vessel) and wherein the first and second underwater hulls are directed towards each other so that the second pontoon, or said part thereof, of the first underwater hull extends towards the first pontoon of the second underwater hull and vice versa.

In an embodiment, the second pontoon of each of the first and second underwater hulls has its full length and is connected to its corresponding first pontoon, wherein the first and second underwater hulls are arranged in an offset manner, for instance in relation to the longitudinal axis of the marine vessel, and wherein the first and second underwater hulls are arranged so that the second pontoon of the first underwater hull extends alongside of the second pontoon of the first underwater hull.

This embodiment thus relates to the case where the T-shaped underwater hulls are assembled before the transport. The first and second underwater hulls in one pair of underwater hulls are in this case arranged "head to toe" with the two second pontoons extending alongside each other.

In another embodiment, the second pontoon of each of the first and second underwater hulls forms two parts, wherein one of said two parts forms an inner part that is connected to its corresponding first pontoon and wherein the other of said two parts forms a separate outer part, wherein the first and second underwater hulls are arranged to be substantially aligned with each other so that the inner part of the second pontoon of the first underwater hull projects towards the corresponding inner part of the second pontoon of the second underwater hull, wherein the two separate outer parts of the first and second underwater hulls are arranged on opposite sides of the two inner parts of the first and second underwater hulls.

This embodiment thus relates to the case where the T-shaped underwater hulls are not fully assembled before the transport, i.e. only an inner part of the second pontoon is connected to the first pontoon during transport, and the remaining portion of the second pontoon forms a separate outer part.

In both the above embodiments, the parts of each pair of underwater hulls are preferably connected to each other so as to form one transport assembly capable of floating stable and upright. For instance, in the case where a portion of the second pontoon forms a separate outer part, the pontoons and pontoon parts of the first and second underwater hulls are joined together so as to form one transport assembly with ability to float stable and upright.

In a further embodiment, the first and second underwater hulls are arranged in such a way that the first pontoons extend across a longitudinal axis of the marine vessel.

BRIEF DESCRIPTION OF DRAWINGS

The present invention will become more fully understood from the detailed description given hereinafter and the accompanying drawings which are given by way of illustration only, and thus are not limitative of the present invention, and wherein.

DESCRIPTION OF EXAMPLE EMBODIMENTS OF THE INVENTION

Examples of the present invention will be described more fully hereinafter with reference to the accompanying drawings, in which examples of the invention are shown. This invention may, however, be embodied in many different forms and should not be construed as limited to the examples set forth herein. Rather, these examples are provided so that this disclosure will be thorough and complete, and will fully convey the scope of the invention to those skilled in the art. Like reference signs refer to like elements throughout.

Figure 1:
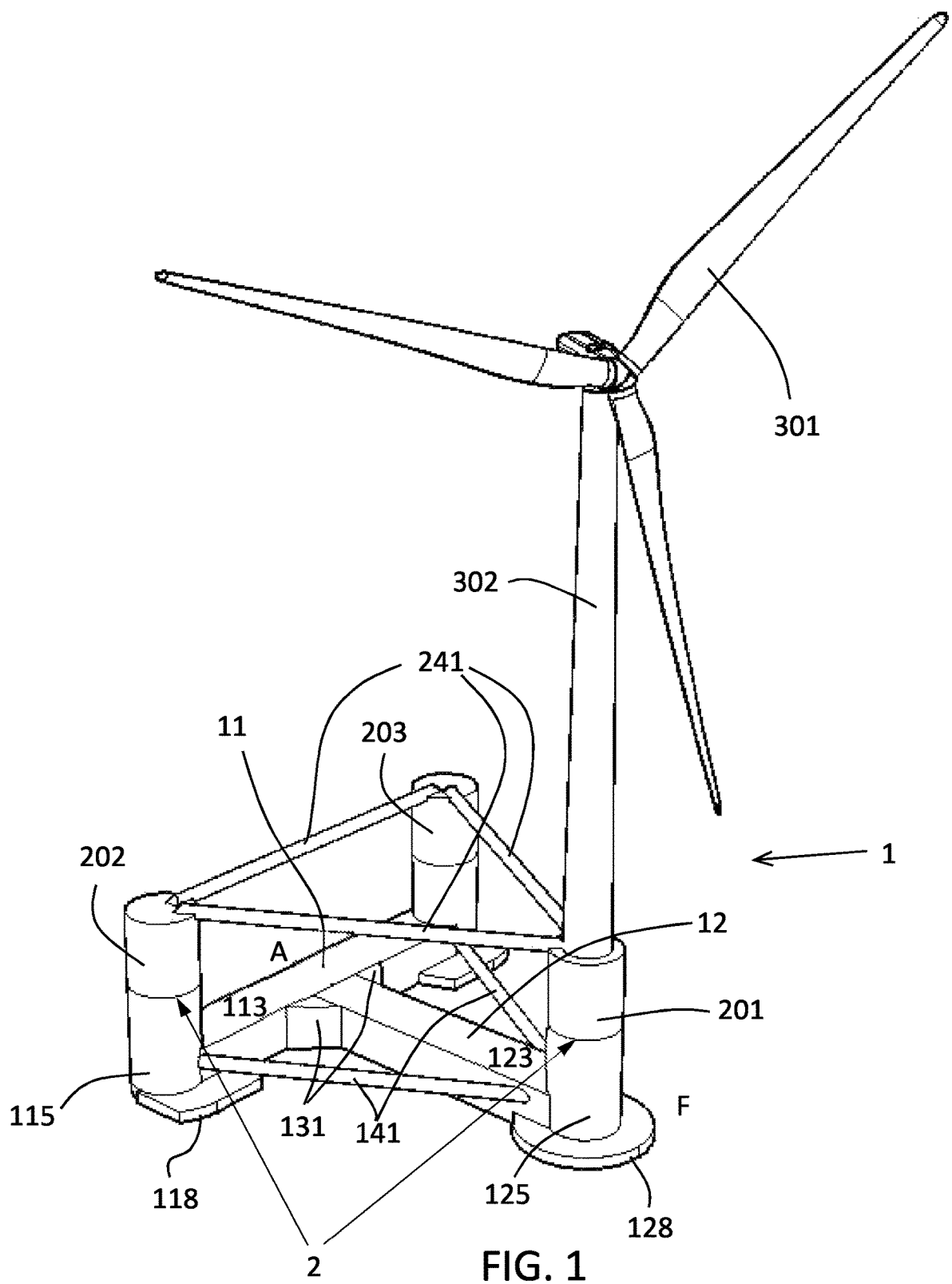
FIG. 1 shows an embodiment of a semi-submersible platform according to the invention with three stabilizing columns and one wind energy harvesting device arranged on one of the stabilizing columns.

The semi-submersible platform 1 shown in FIG. 1 is floating semi-submersed in a body of water, such as the sea, at a draft giving a waterplane 2. The platform is arranged with wind turbine 301 for harvesting energy from the wind and producing electrical energy. The wind turbine 301, which may be an azimuthing horizontal axis turbine as shown in FIG. 1 or a vertical axis wind turbine, is arranged on a support structure 302, such as a structural tower (or mast).

Figure 2:
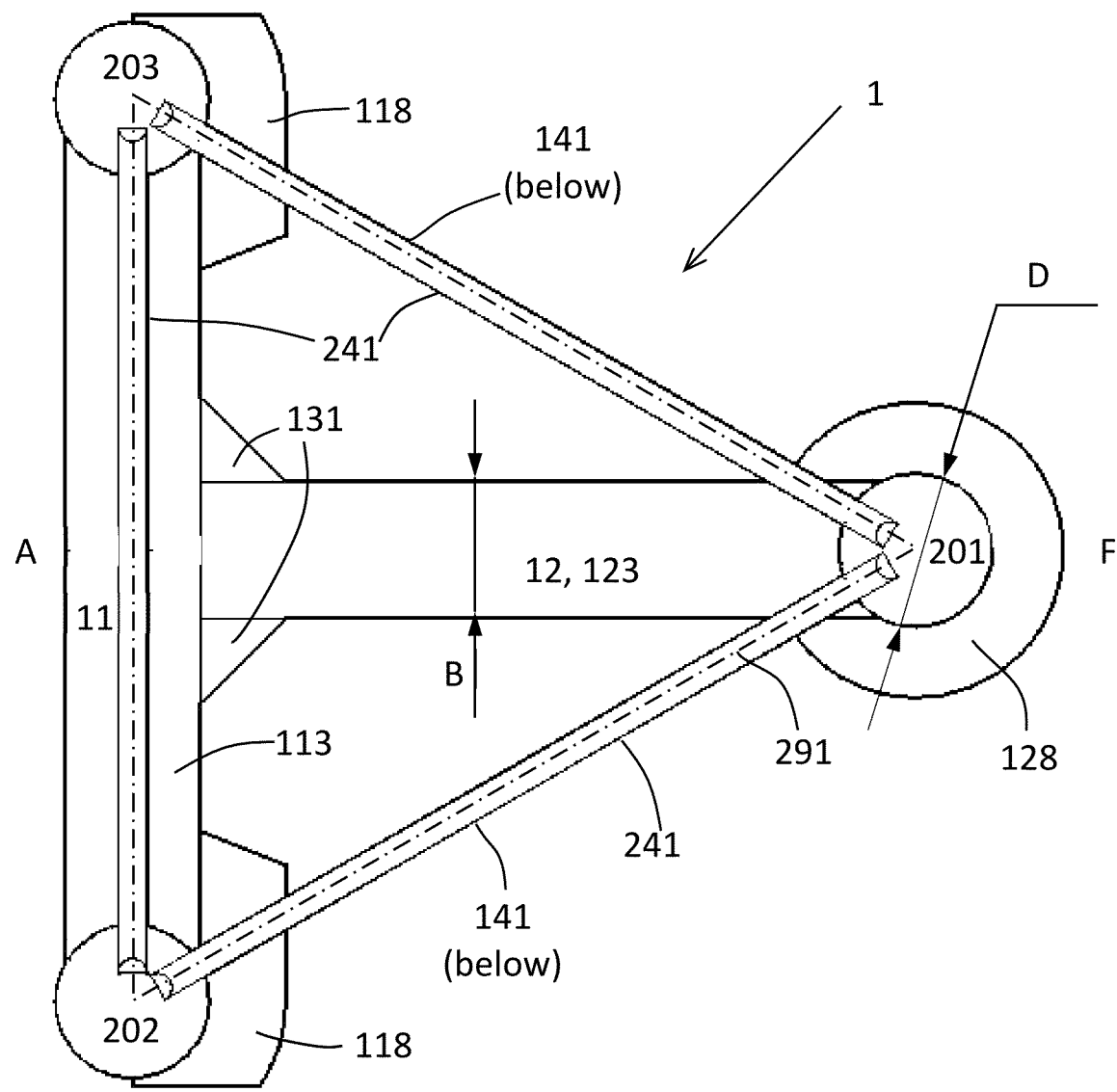
FIG. 2 shows a top view of the same embodiment as shown in FIG. 1 but with the wind energy harvesting device removed.

The semi-submersible platform 1 has an underwater hull made up of two elongated pontoons, where one (second) pontoon 12 is arranged perpendicular to the other (first) pontoon 11. The second pontoon 12 is interconnected at its inner end to the mid-length of the first pontoon 11. This gives that the underwater hull seen from above, FIG. 2, resemble the letter "T", where the first pontoon 11 is the "roof of the T" and the second pontoon 12 is the "pillar of the T".

In the following marine terms will be used to define the directions of the semi-submersible platform 1 and for example the first pontoon 11 is transversely arranged in the aft end "A" and for example the second pontoon 12 is longitudinal arranged with its outward end constituting the forward end "F" of the platform 1, or vice versa depending on definition preferences due to that the platform will be moored in an offshore location with an orientation determined by the most favourable wind direction.

With the above pontoon configuration, the semi-submersible platform 1 will in most aspects become symmetric around the longitudinal centreline of the second pontoon 12.

The pontoons 11 & 12 are buoyant and divided internally with bulkheads and include in a well-known manner ballast tanks and a ballast system, which makes it possible to alter the draft, trim and heel of the semi-submersible platform, as well as potential other tanks. The pontoons 11 & 12 are advantageously arranged with a rectangular cross section and may be with sharp or rounded corners/bilges and are preferable of the same depth/height to provide an effective load transfer between the bottoms and decks of the two pontoons.

At the intersection between the two pontoons 11 & 12 there are at each side of the inward/aft end of the second pontoon 12 at the corners to the first pontoon 11 arranged a triangular buoyant structure 131, which will improve the structural load transfer between the two pontoons by acting as structural brackets. The triangular buoyant structures 131 have the same depth/height as the pontoons.

There are three stabilizing buoyant columns 201, 202 & 203 supported on and interconnected by the underwater hull and protruding above the surface 2 of the body of water. One stabilizing buoyant columns 201 is arranged in the forward end "F" of the semi-submersible platform 1 at the outer end of the second pontoon and the other two stabilizing columns 202 & 203 are arranged at the outer ends of the first pontoon, starboard aft and port aft of the semi-submersible platform 1, respectively.

The stabilizing buoyant columns 201, 202 & 203 are buoyant and provide the semi-submersible platform 1 the required area and moment of inertia at the waterplane and are further divided internally with watertight vertical bulkheads and/or horizontal stringers and include in a well-known manner ballast and void tanks and access to the pontoons.

The stabilizing buoyant columns 201, 202 & 203 are advantageously arranged with a circular horizontal cross section but may also be of other cross section shapes, such as rectangular with sharp or rounded corners, triangular, etc. and are further advantageously arranged with vertical orientation but may also be inclined.

By arranging the centres of stabilizing buoyant columns 201, 202 & 203 on an equilateral triangle 291 and having the stabilizing buoyant columns with the same cross section area/diameter "D", the semi-submersible platform will have the same moment of inertia of the water plane 2 and metacentric height in both longitudinal and transverse direction.

In the embodiment of the invention shown in FIG. 1 the outward shell of each of the three stabilizing buoyant columns 201, 202 & 203 is extended downwardly to the bottom of the pontoons 11, 12 to form rounded ends of the two pontoons at their outward ends.

The stabilizing buoyant columns 201, 202 & 203 are interconnected in their upper part, either at the upper end or just below, with three horizontal bracings 241, one between each pair of stabilizing buoyant columns. These bracings 241 are shown with a circular cross-section but could also be with another type of cross section, e.g. I-beam or box beam. The bracings are advantageously extending partly into the columns to give a smooth load transfer between the bracings 241 and the stabilizing buoyant columns 201, 202 & 203.

In the embodiment of the invention shown in FIG. 1 there are shown two lower horizontal bracings 141 arranged to interconnect the first 11 and second 12 pontoons, one from the outer end of each end of the first pontoon 11 and towards the outer end of the second pontoon 12, located substantially underneath two of the upper bracings 241. In FIG. 1 the two lower horizontal bracings 141 are located just below the deck 113, 123 of the two pontoons 11, 12. The purpose of the lower horizontal bracings 141 is to support the transverse strength of the second pontoon 12, which may be beneficial for the case that the wind is acting on the wind turbine 301 in the transverse direction of the semi-submersible platform 1. While it is beneficial from a strength and fatigue point of view to arrange the two lower horizontal bracings 141 as low as possible, they also need to be above the water during the assembly of the semi-submersible platform 1 to allow that welding can be performed, see further below. By arranging the two lower horizontal bracings 141 just below the deck 113, 123 of the two pontoons 11, 12, they will be located away from the joint between the pontoons 11, 12 and the stabilizing buoyant columns 201, 202 & 203.

At the outer ends of the first pontoon 11 there are arranged added mass and dampening increasing horizontal plates 118 close to the pontoon bottom at the outer ends of the first pontoon. These plates are in the embodiment of the invention shown in FIG. 1 arranged at the same side of the first pontoon 11 as the second pontoon 12 and in such a way that the added mass and dampening increasing plates don't substantially increase the length of the first pontoon 11/overall breadth of the semi-submersible platform 1. To reduce the overall breadth of the semi-submersible platform 1 may be beneficial to meet the transportation requirements of some dry-tow vessels.

In the embodiment of the invention shown in FIG. 1 there is also arranged added mass and dampening increasing horizontal plates 128 at close to the pontoon bottom at the outer end of the second pontoon 12 at the forward end "F" of the semi-submersible platform 1. While the horizontal plate 128 is shown as one continuous plate around the end of the second pontoon, the horizontal plate may be divided in plates with openings in-between, for example to allow mooring line attachments to not be disturbed by the plates.

The wind-turbine 301 of azimuthing horizontal axis type as shown in FIG. 1 is arranged on a support structure 302, such as a structural tower (or mast) which is supported on the forward stabilizing buoyant column 201.

The semi-submersible platform 1 is moored with, in a well-known manner, a catenary mooring system or taut-leg mooring system. In alternative embodiment the semi-submersible platform 1 may be moored with tendons and the semi-submersible platform becomes a tension leg platform (TLP). As all these three types of mooring systems are well-known from the semi-submersible oil & gas industry and are therefore not described further or shown on the drawings. There are a number of alternative manners to attach the mooring lines/tendons to the semi-submersible platform but these are not detailed here.

Figure 3:
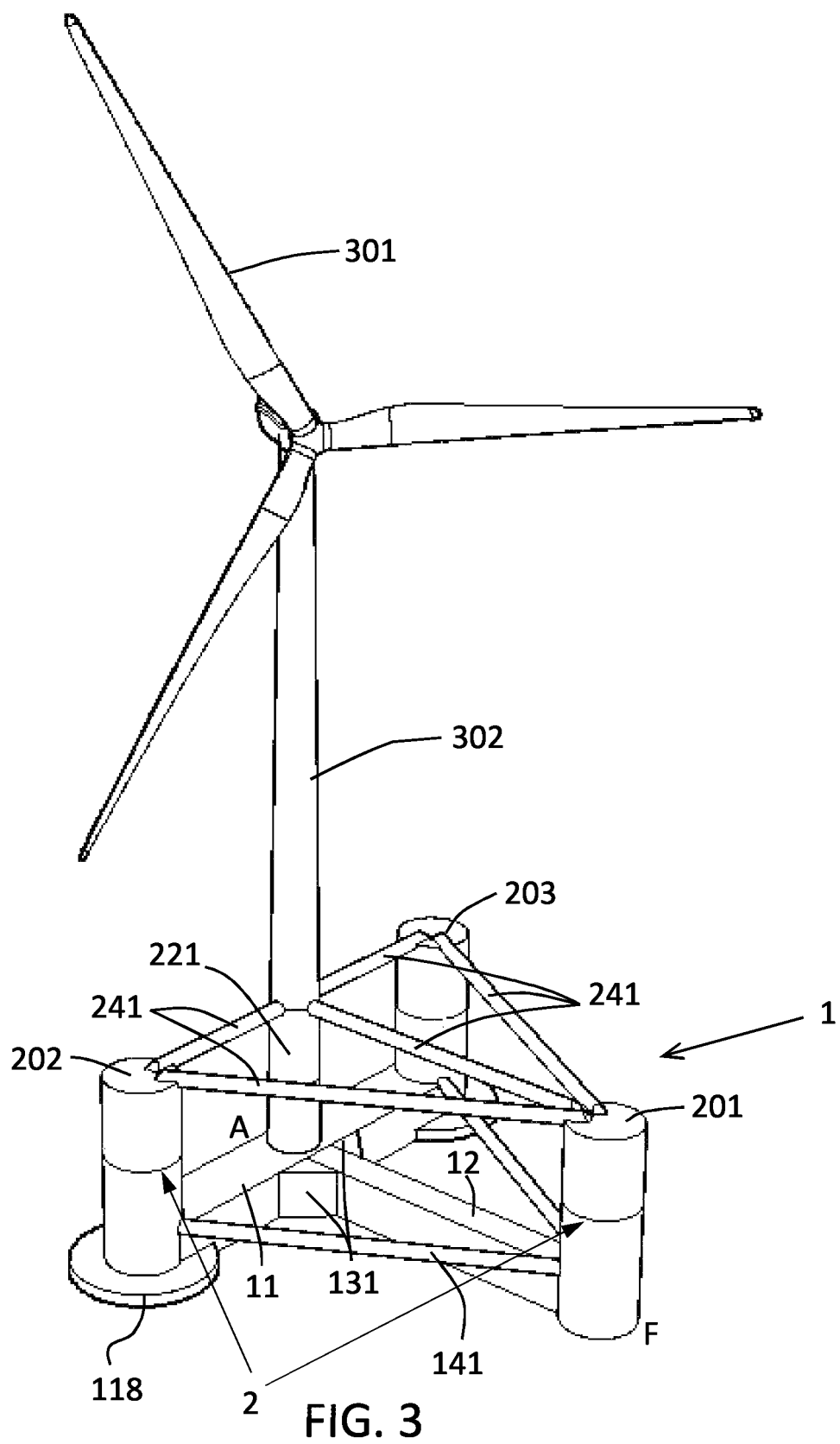
FIG. 3 shows an embodiment of a semi-submersible platform according to the invention with one wind energy harvesting device arranged on a separate column.

In an alternative embodiment of the semi-submersible platform 1 shown in FIG. 3, wind turbine 301 with its support structure (tower) 302, is arranged on a separate column 221 which primary purpose is to support the wind turbine 301. This separate column may either be buoyant or non-buoyant. By arranging the wind turbine on a separate column 221, the structural loading of the stabilizing buoyant column 201 are reduced.

The separate column 221 is supported on one of the two pontoons 11, 12 and may further be interconnected with the buoyant stabilizing columns with upper bracings, 241.

In FIG. 3 there is also shown an alternative embodiment of the lower horizontal bracings 141, where the lower horizontal bracings are arranged with their centre level with the pontoons deck, 113,123. This alternative embodiment may be beneficial in case of limited displacement/larger draught during assembly of the semi-submersible platform 1. The alternative embodiment of the horizontal bracings 141 in FIG. 3 is not related to the separate column 221 disclosed in FIG. 3 and could have been combined with any other embodiment of the semi-submersible platform 1.

Figure 4:
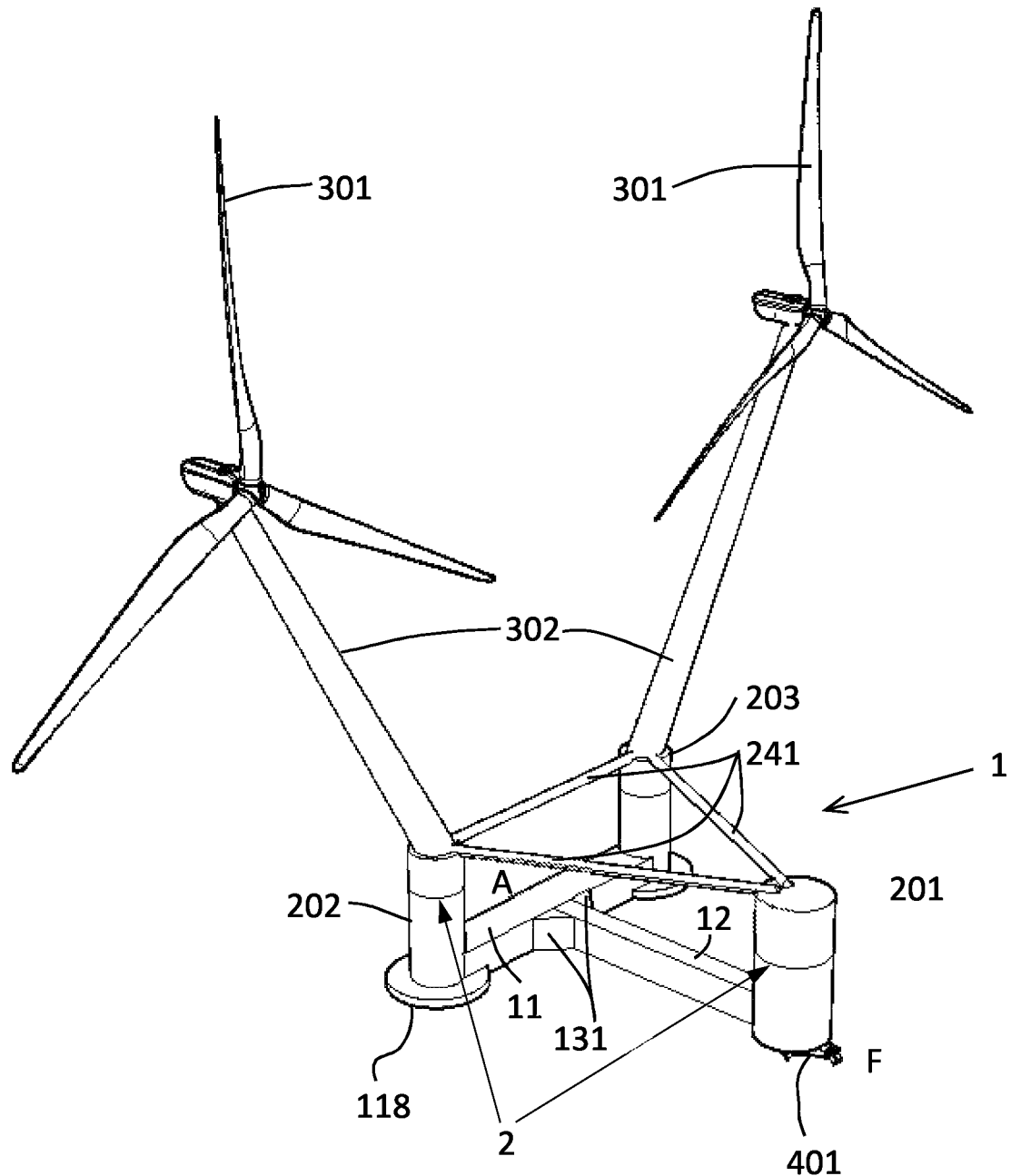
FIG. 4 shows an embodiment of a semi-submersible platform according to the invention with three stabilizing columns and two wind energy harvesting device arranged on inclined support structures on one column each.

In FIG. 4 an alternative embodiment of the semi-submersible platform 1 with two wind-turbines 301 with a support structure (tower) 302 each arranged on the two columns 202, 203 in the aft end "A". These wind turbines may be of a fixed orientation parallel with the longitudinal direction of the semi-submersible platform and instead the platform is aligned with the most favourable wind direction, i.e. weather vane.

To allow the semi-submersible platform 1 weather vane there is arranged a mooring turret 401 underneath the forward stabilizing column 201 which the mooring lines are attached to and around which the semi-submersible platform may rotate. The use of mooring turrets to allow floating units to weather vane is a well-known manner from the offshore oil & gas industry and therefore the turret and mooring are not further described herein.

With the wind turbines orientated in a fixed direction towards the semi-submersible platform 1 that weather vane, the varying wind forces will primarily act in the longitudinal direction of the semi-submersible platform. It may therefore be beneficial to have an increased stability/metacentric height/moment of inertia in the longitudinal direction than transversely and therefore the forward buoyant stabilizing column 201 may have a larger water-plane area/diameter than the aft buoyant stabilizing columns 202, 203 and also be arranged further apart from these, resulting in that the centre of the three stabilizing buoyant columns are arranged at an isosceles triangle 292, as shown in FIG. 5.

Figure 5:
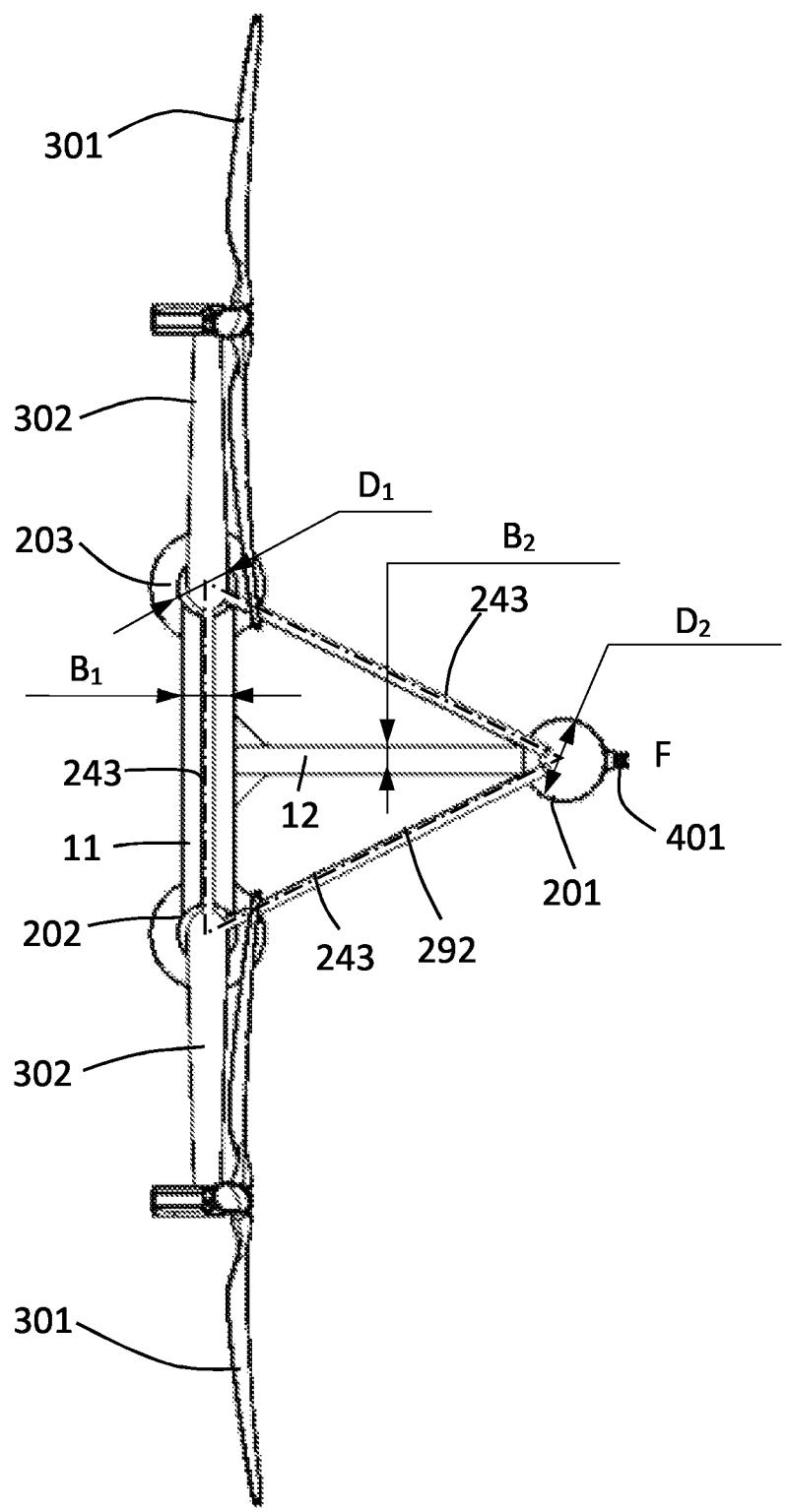
FIG. 5 shows a top view of the same embodiment as shown in FIG. 4.

From FIGS. 4 and 5 it's also shown that the two wind turbine support structure (tower) 302 are inclined outwards in transverse direction, parallel to the centre-line of the first pontoon 11. This will give a larger separation of the two turbines and further increase the weather vaning moment on the semi-submersible platform 1 rotating around the mooring turret 401.

In FIG. 5 the semi-submersible platform is shown in an underwater embodiment where there are no lower horizontal bracings and the second pontoon 12 is made narrower due to the lower transverse forces acting on the second pontoon 12 and forward stabilizing column 201.

Figure 6:
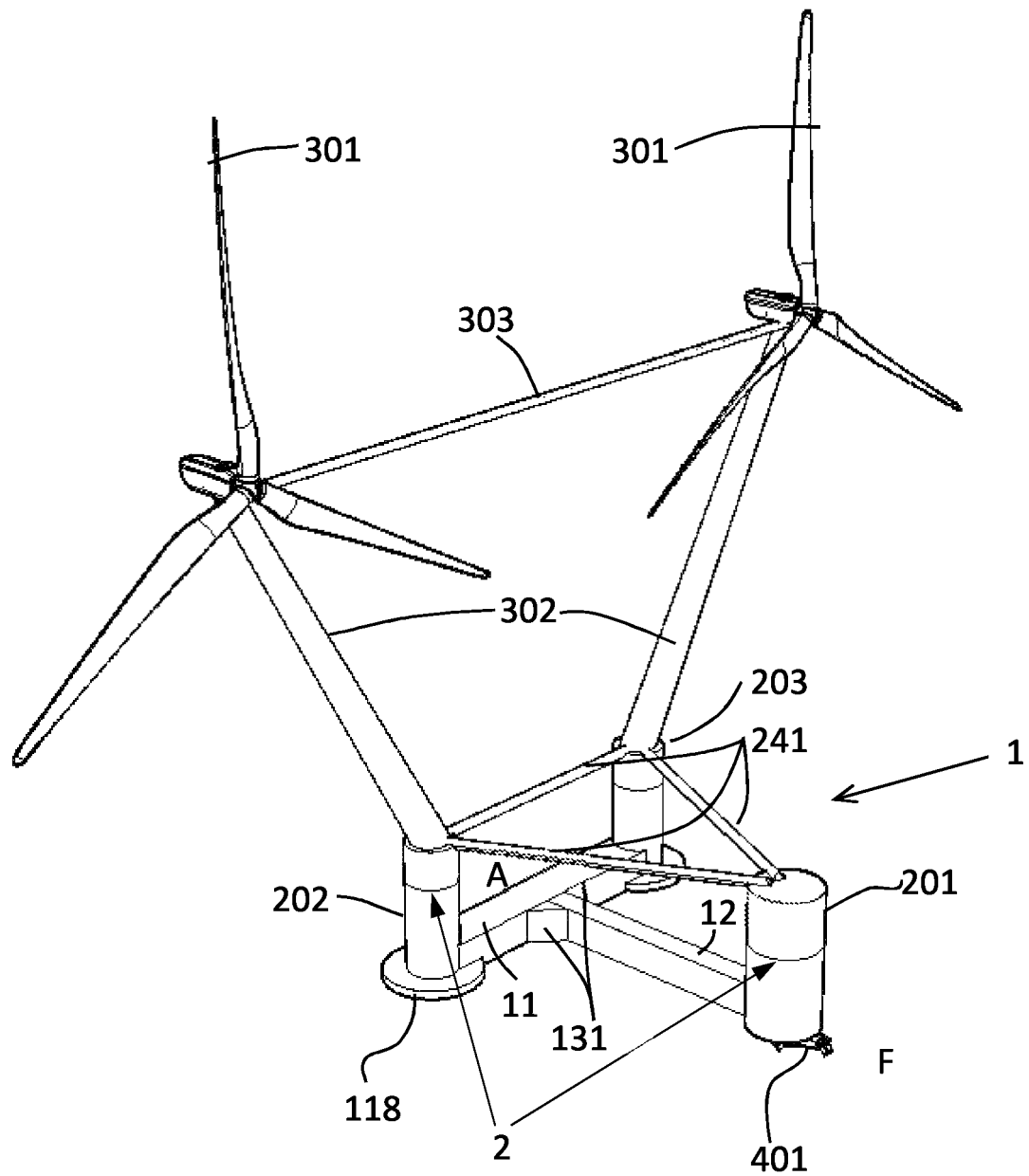
FIG. 6 shows the same embodiment of a semi-submersible platform as shown in FIG. 4 but with a horizontal bracing in-between the upper end of the wind turbine supporting structures (towers).

In FIG. 6 an identical embodiment of the semi-submersible platform 1 as in FIG. 4 but with a horizontal bracing 291 added in-between the upper ends of the wind-turbine supporting structures 302. The horizontal bracing 291 reduce the static bending moment in the wind-turbine supporting structures 302.

Figure 7:
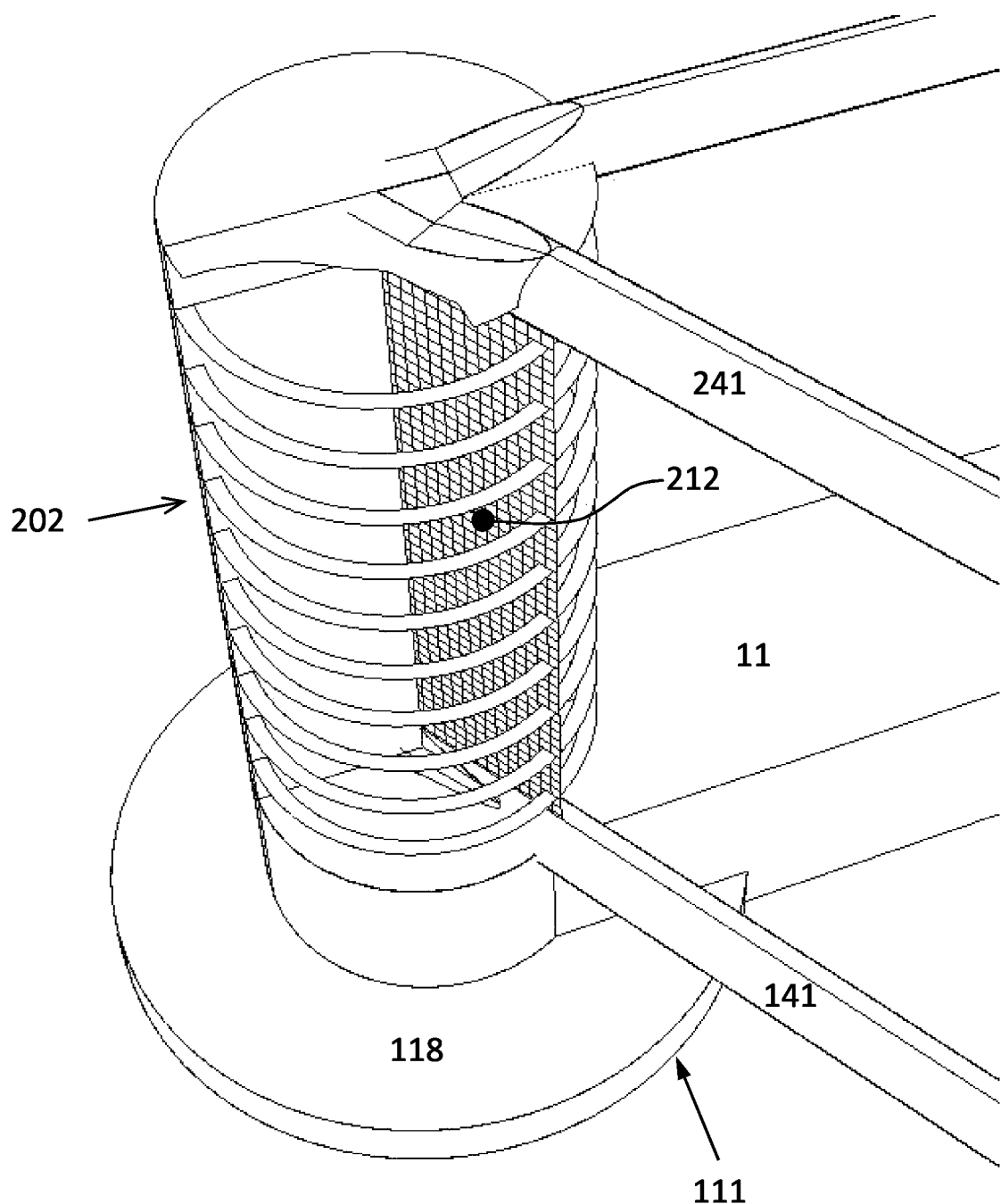
FIG. 7 shows the magnified view of stabilizing buoyant column where the shell plating has been removed to disclose an internal vertical bulkhead.

In FIG. 7 a magnified view of the starboard aft stabilizing buoyant column 202 is shown where the shell plating has been removed. Inside the columns there are a vertical bulkhead 212 aligned with the direction of the lower horizontal bracing 141 and upper bracing 241 towards the centre of the stabilizing buoyant column. This vertical bulkhead which advantageously is extended down to the pontoon bottom provide a robust structural load transfer between the two bracings, the stabilizing buoyant column and the pontoon 11. Corresponding vertical bulkheads are arranged in the other stabilizing buoyant columns 201, 203.

FIG. 8-11 shows the various steps of a preferred method for construction, transport and assembly of the semi-submersible platform 1.

Figure 8:
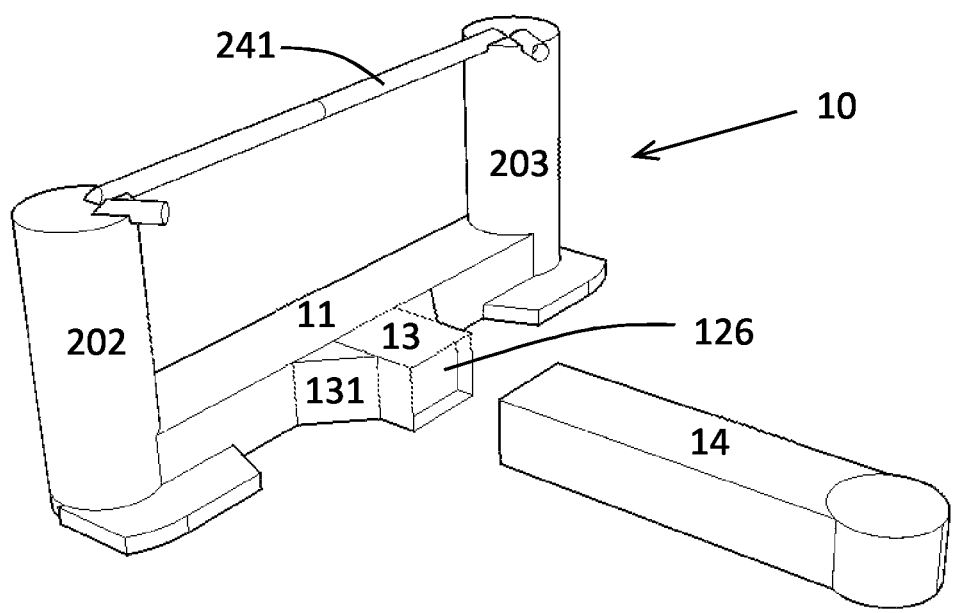
FIG. 8 shows a view of the first hull-assembly and the outer part of the second pontoon, an embodiment during the preferred method for construction.

In FIG. 8 the first hull-assembly 10 and the outer part 14 of the second pontoon are shown. The first hull assembly is constructed of the first pontoon 11, the two aft stabilizing buoyant columns 202, 203, one upper bracing 241 between these columns, the triangular buoyant structures 131 and the inner part 13 of the second pontoon and short interface parts to the other lower horizontal 141, if available, and upper bracings 241.

Figure 10:
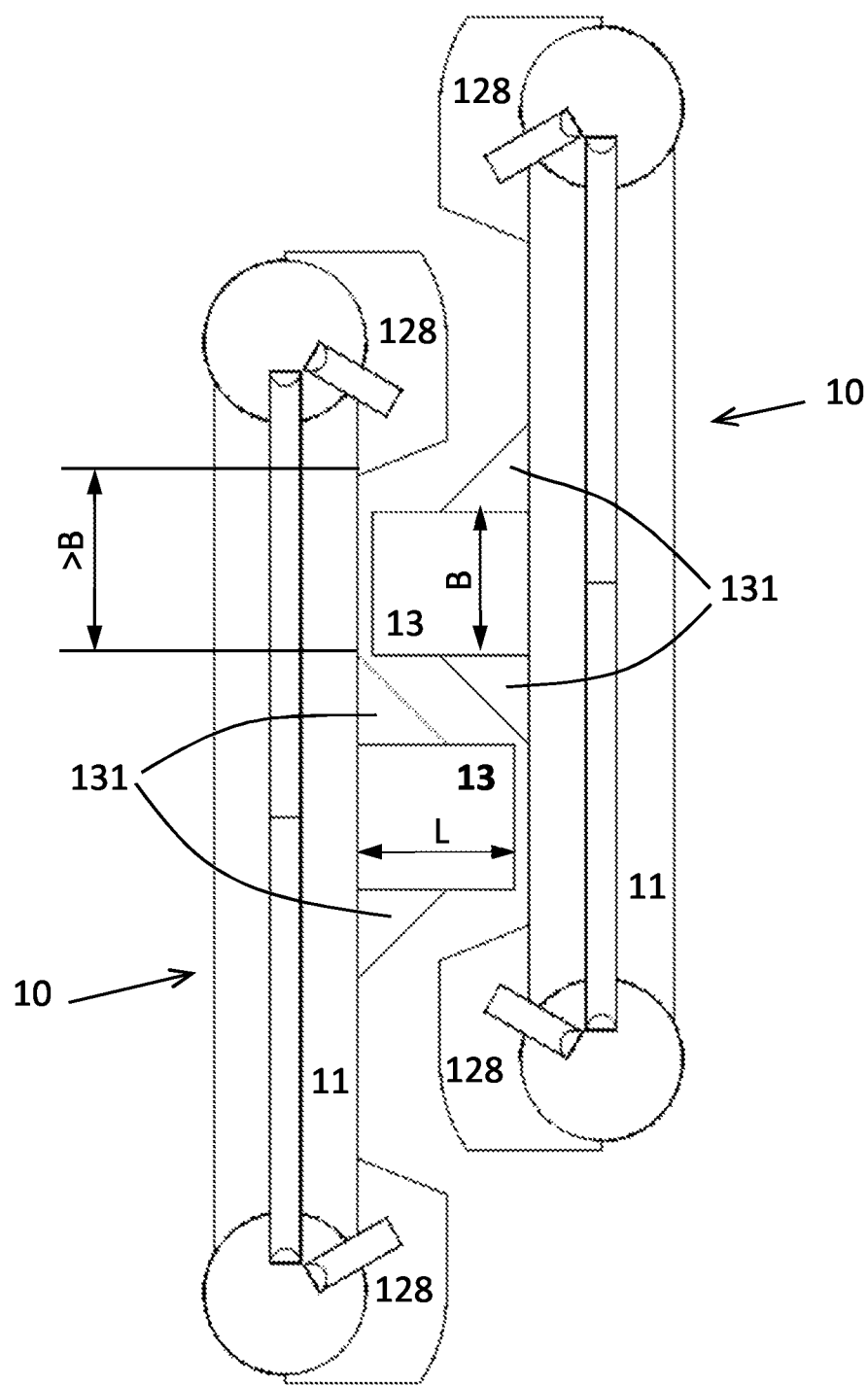
FIG. 10 shows a stowage arrangement of a pair of first hull-assemblies

The inner part 13 of the second pontoon is of sufficient length "L", see FIG. 10, to allow the first hull-assembly 10 to float stable and upright. The outer part 14 of the second pontoon is of such dimension that this also will float stable. There are watertight bulkhead 126 enclosing the first hull assembly 10/inner part 13 of the second pontoon and the outer part 14 of the second part (not shown) close to the area where they shall be joined.

The first hull-assembly 10 and the outer part 14 of the second pontoon is intended to be constructed at a first location, i.e. shipyard, and thereafter transported to a second location, i.e. a port close to the final offshore location of the floating wind semi-submersible platform. The first hull-assembly 10 and the outer part 14 of the second pontoon are accordingly of such dimensions that they may be positioned in a body of water, for example at a quayside in the second location.

Figure 9:
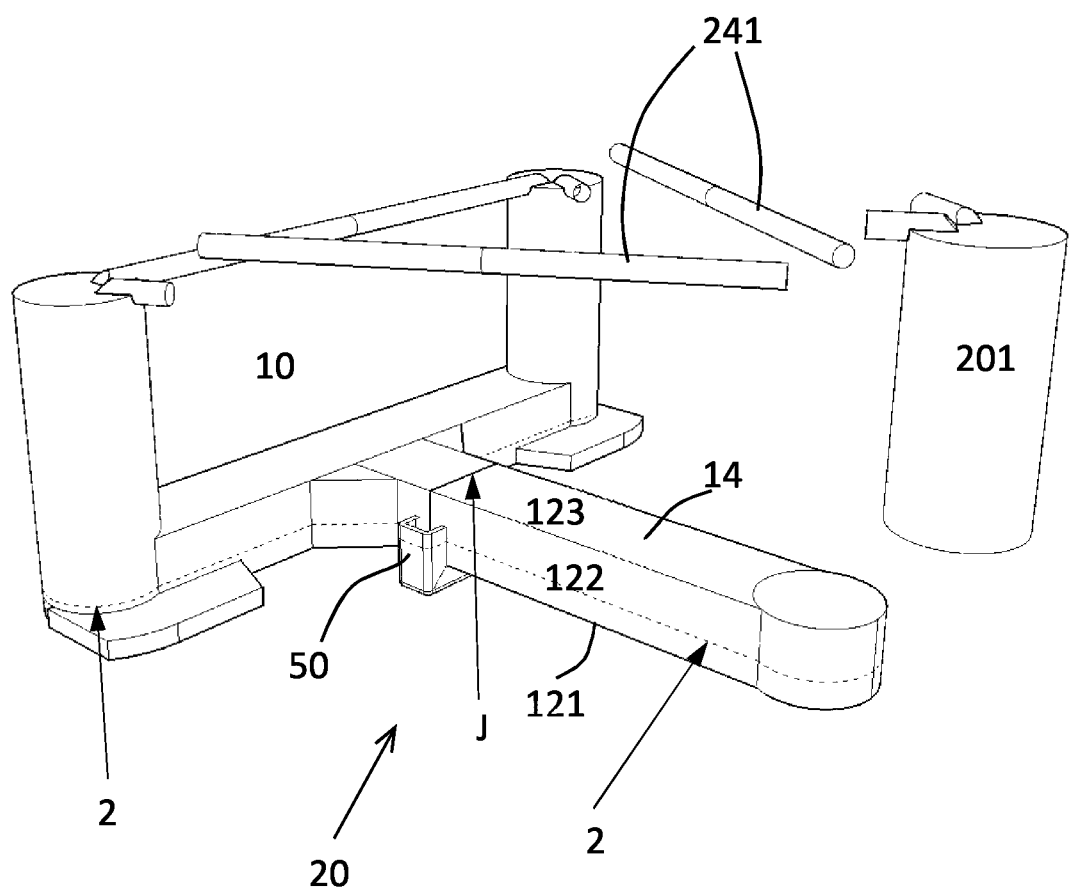
FIG. 9 shows a view of the joining of the first hull-assembly and the outer part of the second pontoon by the use of a welding inside a welding habitat to a second hull-assembly and other blocks to be erected onto the second hull-assembly.

FIG. 9 shows one method for assembly of the semi-submersible platform 1. The first hull-assembly 10 and the outer part 14 of the second pontoon is floating in a body of water 2, such as in the sea at a quayside. Due to the enclosed construction they will float with the pontoon deck of the second pontoon well above the surface plane of the body of water 2.

The first hull-assembly 10 and the outer part 14 of the second pontoon will be positioned in relation to each other and ballasted as required to float at the same draught and trim. Guiding arrangement (not shown) will be used as is a well-known manner from the shipbuilding industry. Around the area "J" where the first hull-assembly 10 and the outer part 14 of the second pontoon shall be joined, there is positioned a welding habitat 50.

The welding habitat 50 is a structure, preferable floating in the body of water, with sealing devices (not shown) that will seal towards the pontoon bottom 121 and pontoon sides 122 at both sides of the joining area "J". Due to the sealing a watertight compartment is obtained within the welding habitat 50.

The water is evacuated from the welding habitat and the volumes/tanks inside the second pontoon at the joining area "J" and the inside of the welding habitat will become air-filled.

This will allow that the joint "J" can be welded in a dry area and the first hull-assembly 10 and the outer part 14 of the second pontoon will be joined to a second hull-assembly 20. After painting of the area of the joining "J" the welding habitat will be filled with water and removed from the second hull assembly, for example by splitting the welding assembly in two parts and the second hull-assembly 20 will float in the body of water as one structure.

The remaining parts of the semi-submersible platform 1, such as the forward stabilizing buoyant column 201 and the two upper bracings 241 interconnecting the forward stabilizing buoyant column with the other stabilizing buoyant columns part of the original first hull assembly 10, are erected, preferably with a crane located on the quay. Thereafter the semi-submersible platform 1 is ready for installation of the wind turbine 301 and its supporting structure 302 (see FIGS. 1, 3 & 4).

As mentioned above, an advantageous embodiment of the invention is that the method allow that the parts of the semi-submersible platform, including the first hull-assembly 10, are fabricated in a first location and then transported to a second location where they are assembled. The two locations may be far apart, such as in different countries, but the second location is preferable as close as possible to the final offshore installation location of the floating wind semi-submersible.

The method therefore requires that the hull parts are transported from a first location to a second location. The cost for such transportation need to be reduced and one beneficial embodiment is to transport the parts on a semi-submersible dry-tow vessel, which allow that the first hull-assembly may be floated on and off in a well-known manner for such dry tow vessels.

To reduce the transportation cost it is important to be able to transport as many hull as possible at a single vessel. FIG. 10 shows a beneficial embodiment of the method that reduce the required space onboard the dry tow vessel.

Due to the favourable geometry of the first hull assembly 10, two hull assemblies may be positioned in pairs opposite to each other with their respective inner part 13 of the second pontoon pointing towards the other first hull-assembly 10 in the pair and where the inner part of the second pontoons 13 of the respective first hull-assembly 10 pair are arranged side-by-side.

The first hull-assembly 10 is therefore arranged such that the added mass and dampening increasing horizontal plates 128 at the first pontoon 11 are arranged at a distance ">B" from the inner part 13 of second pontoon, or the triangular buoyant structure 131 if applicable, corresponding to at least the width "B" of the second pontoon.

Multiple first hull-assemblies are transported on the same dry-tow vessel and arranged in pairs of two, where the two first hull-assemblies making up a pair are arranged opposite to each other with their respective inner part of the second pontoon pointing towards the other first hull-assembly in the pair and where the inner part of the second pontoons of the respective first hull-assembly pair are arranged side-by-side. This will allow that multiple pairs of first hull assemblies may be transported at a single dry-tow vessel.

Figure 11:
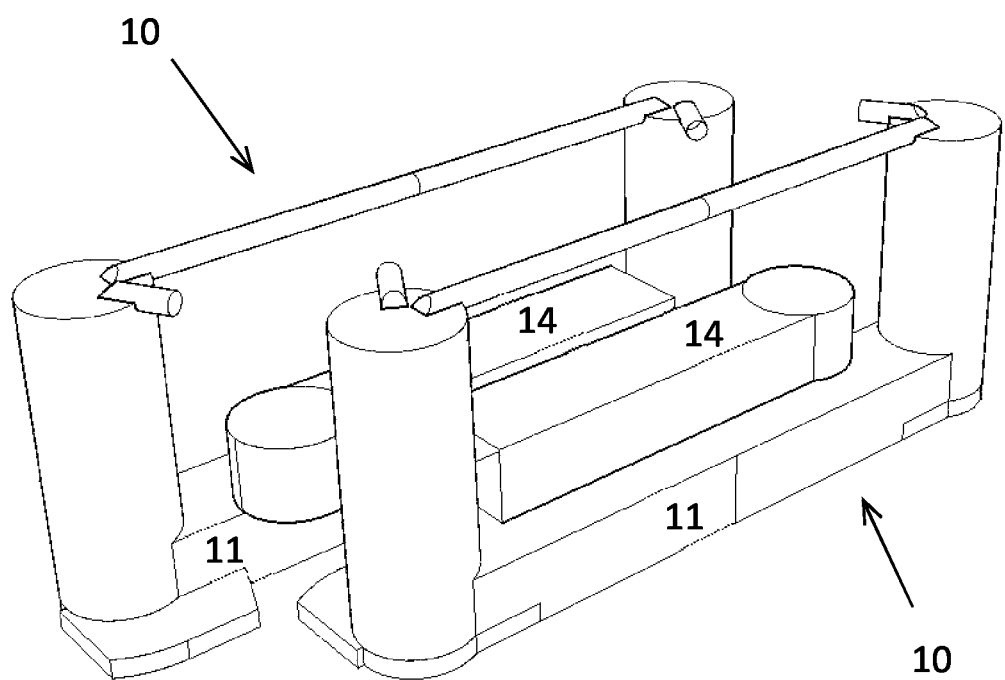
FIG. 11 shows the outer part of the second pontoon stowed on top of the first pontoon of the first hull-assembly.

In a further advantageous embodiment of the method shown in FIG. 11, the outer part 14 of the second pontoon 12 may be stowed on top of the first pontoon 11 of their respective first hull assembly 10. This will further reduce the space required on-board the dry tow vessel.

Figure 12:
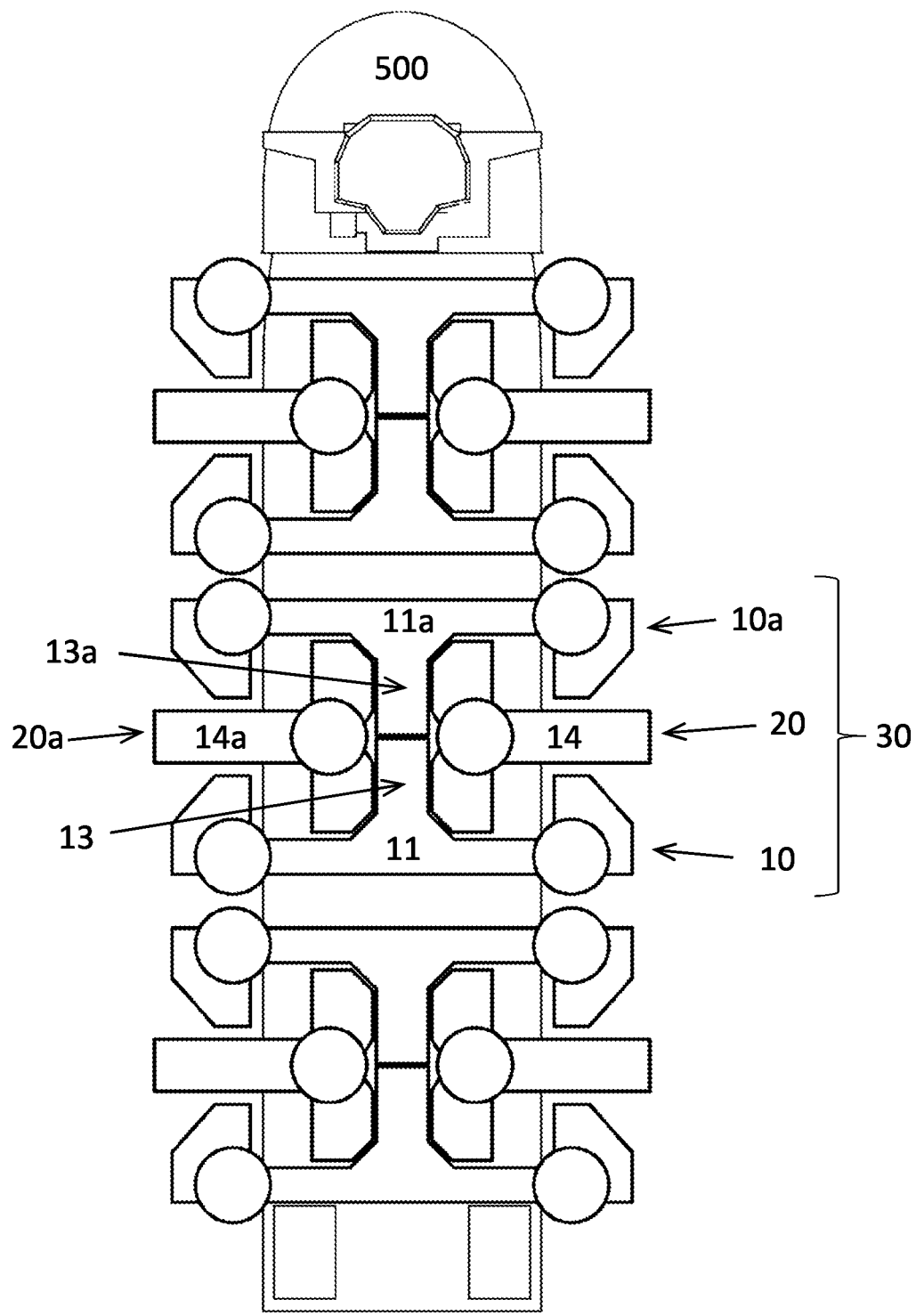
FIG. 12 shows the transport of six hulls of semi-submersible platforms where the hulls are arranged two and two into transport structures where the first hull assemblies are arranged with the first pontoons parallel to each other with the inner part of the second pontoons directed towards each other and where the second hull assembly are arranged with the outer parts of the second pontoons parallel to and in-between the first pontoons, one on each side of the inner parts of the second pontoons.
Figure 13:
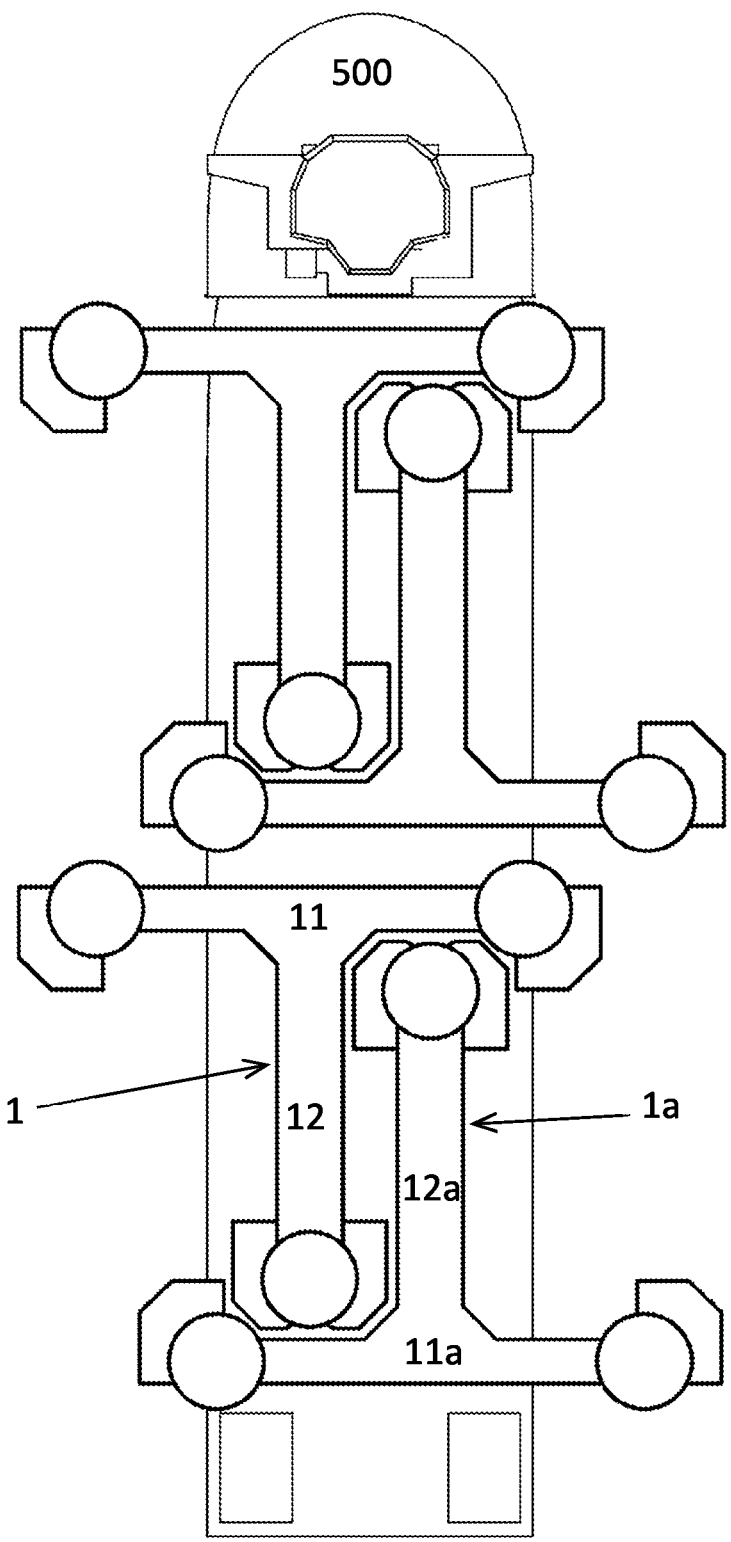
FIG. 13 shows the transport of four underwater hulls where the hulls are arranged two and two in a "head to toe" arrangement with their second pontoons side by side with their first pontoons on different ends of the second pontoons.

FIGS. 12 and 13 show two different examples of how to transport several pairs of underwater hulls on a marine vessel from a first location to a second location.

FIG. 12 shows the transport of six hulls of semi-submersible platforms 1, 1a where the hulls are arranged two and two into transport structures where the first hull assemblies 10, 10a are arranged with the first pontoons 11, 11a parallel to each other with the inner part of the second pontoons 13, 13a directed towards each other and where the second hull assemblies 20, 20a are arranged with the outer parts of the second pontoons 14, 14a parallel to and in-between the first pontoons 11, 11a, one on each side of the inner parts of the second pontoons 13, 13a.

FIG. 12 relates to an example where the T-shaped underwater hulls are not fully assembled before the transport, i.e. only the inner part 13, 13a of the second pontoon 12 is connected to the first pontoon 11, 11a during transport, and the remaining portion of the second pontoon forms a separate outer part 14, 14a.

FIG. 13 relates to an example where the T-shaped underwater hulls are assembled before the transport and shows the transport of four underwater hulls where the hulls are arranged two and two 1, 1a in a "head to toe" arrangement with their second pontoons 12, 12a side by side with their first pontoons 11, 11a on different ends of the second pontoons.

As shown in FIG. 12, each of the two underwater hulls 1, 1a are divided into a first 10, 10a and a second hull assembly 20, 20a, where each of the first hull-assemblies comprises the first pontoon 11, 11a and a buoyant inner part 13, 13a of the second pontoon 12, 12a that has a length L that is sufficient to allow each of the first hull-assemblies 10, 10a to float substantially stable and upright. The two first hull assemblies 10, 10a are arranged such that the two first pontoons 11, 11a are substantially parallel to each other and the two buoyant inner parts 13, 13a extend towards each other.

The second hull assemblies 20, 20a are arranged in between the two first hull assembles 10, 10a in such a way that the outer parts 14, 14a of the second pontoons 12, 12a are substantially parallel to the two first pontoons 11, 11a, one on each side of the two buoyant inner parts 13, 13a, respectively.

The two first hull assemblies 10, 10a and second hull assemblies 20, 20a are joined together so as to form one transport assembly 30 with ability to float stable and upright.

As shown in FIG. 13, the first and second underwater hull are arranged so that the second pontoon 12 of the first underwater hull 1 extends alongside of the second pontoon 12a of the second first underwater hull 1a, but in opposite directions and so that the first pontoons 11, 11a are positioned on opposite ends relative to said second pontoons.

In the examples shown in FIGS. 12-13, the first and second underwater hulls or the two first hull assemblies 10, 10a are arranged in such a way that the first pontoons 11, 11a extend in a transversal direction across a longitudinal axis of the marine vessel.

It is to be understood that the invention is by no means limited to the embodiments described above, and may be varied freely within the scope of the claims below. For example, the upper bracings 241 and lower horizontal bracings 141 may be arranged in a different manner but still interconnect the pontoons and stabilizing buoyant columns, 201, 202, 203. Further, the stabilizing buoyant columns, 201, 202, 203 need not necessarily be extending strictly vertically from the pontoons as in the shown embodiments but may instead be inclined.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skilled in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and method of assembly of the present invention. However, the invention should be regarded as illustrative rather than restrictive, and not as being limited to the particular examples discussed above. The different features of the various examples and methods of the invention can be combined in other combinations than those explicitly described.

LIST OF REFERENCE SIGNS

1: Semi-submersible offshore platform
2: Water plane of body of water/sea
10: First hull-assembly
11: First pontoon
12: Second pontoon
13: Inner part of second pontoon
14: Outer part of second pontoon
20: Second hull assembly 30: Transport assembly
50: Welding habitat
111: First pontoon bottom
113: First pontoon deck
115: First pontoon shell, rounded part
118: Added mass and dampening increasing horizontal plates
121: Second pontoon bottom
122: Second pontoon sides
123: Second pontoon deck
125: Second pontoon shell, rounded part
126: Second pontoon watertight bulkhead
128: Added mass and dampening increasing horizontal plates
131: Triangular buoyant structures
141: Lower horizontal bracing
201: Stabilizing buoyant column
202: Stabilizing buoyant column
203: Stabilizing buoyant column
212: Vertical bulkhead inside column
221: Separate column(s)
241: Upper bracings
291: Equilateral triangle
292: Isosceles triangle
301: Wind turbine(s)/Wind energy harvesting device(s)
302: Wind turbine supporting structure(s)
303: Horizontal bracing
401: Mooring turret
500: Marine vessel
A: Aft end
B: Width of pontoons
D: Diameter of column
F: Forward end
J: Joint/seem between inner and outer part of second pontoon
L: Length of inner part of second pontoon
T: The underwater hull/pontoon configuration

OTHER REFERENCED DOCUMENTS

[1] Floating Offshore Wind Foundations: Industry Consortia and Projects in the United States, Europe and Japan, An Overview, May 2013 Update, Main(e) International Consulting LLC; https://cdn.website-editor.net/073319e35fa34e6189750e64c2e99060/files/uploaded/Floating%252BOffshore%252BWind%252BPlatforms%252BConsortia%252Bfor%252Bweb.pdf
[2] Experimental validation of the W2Power Hybrid Floating Platform, Pedro Mayorga, EnerOcean S.L., Paper presented at EERA DeepWind 2016, 13th Deep Sea Offshore Wind R&D Conference, Trondheim (Norway), Jan. 20-22, 2016, https://www.sintef.no/gloabalassets/project/eera-deepwing2016/presentations/g2_mayorga.pdf
[3] Development of Offshore Wind Turbine Floater that Blends into Japanese Waters—Evaluation of the Validity for Design and Applied Methods for V-shaped Semi-submersible Floating structure, Masao Komatsu et al., Mitsubishi Heavy Industries Technical Review Vol. 53 No. 2 (June 2016), https://www.mhi.co/jp.technology/review/pdf/e532/e532030.pdf
[4] TRUSSFLOAT—Marketing video showing construction methodology, Dolfines SAS, November 2017, https://dolfines.fr/floater-for-offsore-wind-turbines-trussfloat/ or https://www.youtube.com/watch?v=LggyY0DLKIQ

The invention claimed is:

1. A semi-submersible platform for positioning in a body of water and for production of electrical energy from wind energy, the semi-submersible platform comprising:
   a submersible underwater hull made up of at least a first and second elongated pontoon;
   at least three columns supported on and interconnected by the submersible underwater hull and protruding above the surface of the body of water when the semi-submersible platform is positioned in the body of water,
   wherein at least three of said columns form stabilizing buoyant columns;
   at least one wind energy harvesting device arranged on a supporting structure arranged at an upper end of one of the at least three columns,
   wherein
   said first elongated pontoon is within two outer parts supporting and interconnecting to a lower end of two of the stabilizing columns,
   said second elongated pontoon is perpendicular to and interconnecting to said first elongated pontoon at mid-length of said first pontoon,
   said second elongated pontoon is supporting and interconnecting to a lower end of a third stabilizing column at a third outer part opposite to the end interconnecting to said first elongated pontoon,
   said first and second elongated pontoons are interconnected mid-length of said first elongated pontoon so that the first and second elongated pontoons form a structure resembling the letter "T" in a horizontal plane, wherein the T-shaped structure has three ends, and
   wherein at least one of said at least three stabilizing buoyant columns is arranged at each of the three ends of the T-shaped structure.

2. The semi-submersible platform according to claim 1, wherein said first and second elongated pontoons are four-sided cross-sections and are each arranged with two sides, a bottom and a deck and that said first and second elongated pontoons are same height at their interconnection.

3. The semi-submersible platform according to claim 1, wherein two lower horizontal bracings are arranged to interconnect the first and second elongated pontoons, one of the two horizontal bracing arranged from the outer part of each end of the first elongated pontoon and one of the two horizontal bracing towards the outer part of the second pontoon.

4. The semi-submersible platform according to claim 3, wherein two lower horizontal bracings are arranged at the deck level of the first and second elongated pontoons.

5. A semi-submersible platform according to claim 1, characterised in that the centre of three stabilizing buoyant columns are arranged at an approximately equilateral triangle.

6. The semi-submersible platform according to claim 1, wherein horizontal plates are arranged at the bottom of the outer ends of the first elongated pontoon in order to increase added mass and dampening.

7. The semi-submersible platform according to claim 1, wherein horizontal plates are arranged at the bottom of the outer ends of the second elongated pontoon in order to increase added mass and dampening.

8. The semi-submersible platform according to claim 1, wherein one wind energy harvesting device is arranged on a vertical supporting structure supported on one of the at least three columns.

9. A semi-submersible platform according to claim 1, wherein two wind energy harvesting devices are arranged on supporting structures, one wind energy harvesting device at each of the stabilizing buoyant columns arranged at each end of the first elongated pontoon.

10. A method for assembling of a semi-submersible platform comprising:
- a submersible underwater hull made up of at least a first and second elongated pontoon;
- at least three columns supported on and interconnected by the submersible underwater hull and protruding above the surface of the body of water when the semi-submersible platform is positioned in the body of water, wherein at least three of said columns form stabilizing buoyant columns;
- said first elongated pontoon is within two outer parts supporting and interconnecting to a lower end of two of the stabilizing columns
- said second elongated pontoon is perpendicular to and interconnecting to said first elongated pontoon at mid-length of said first pontoon
- said second elongated pontoon is supporting and interconnecting to a lower end of a third stabilizing column at a outer part opposite to the end interconnecting to said first elongated pontoon,
- said first and second elongated pontoons are interconnected mid-length of said first elongated pontoon so that the first and second elongated pontoons form a structure resembling the letter "T" in a horizontal plane wherein the T-shaped structure has three ends, and
- wherein at least one of said at least three stabilizing buoyant columns is arranged at each of the three ends of the T-shaped structure
- wherein the method comprises:
  - joining a first hull-assembly to an outer part of the second elongated pontoon so as to form a second hull assembly, wherein the first hull-assembly comprises the first elongated pontoon, two of the stabilizing columns and a buoyant inner part of the second elongated pontoon that has a length that is sufficient to allow the first hull-assembly to float substantially stable and upright, and wherein the outer part of the second elongated pontoon is of such dimension that it also floats substantially stable.

11. The method according to claim 10, wherein the method comprises:
- prior to joining, positioning the first hull-assembly and the outer part of the second elongated pontoon in a body of water so as to float substantially stable and upright and at substantially the same draught and trim so as to provide for joining.

12. The method according to claim 10, joining the first hull-assembly to the outer part of the second elongated pontoon by joining the outer part of the second elongated pontoon to the buoyant inner part of the second elongated pontoon.

13. The method according to claim 10, wherein the first hull-assembly is joined to the outer part of the second elongated pontoon by means of welding.

14. The method according to claim 13, wherein welding of a lower part of the joint takes place inside a welding habitat arranged around the joint and from which the water has been evacuated.

15. The method according to claim 10, wherein the second hull-assembly is floating stable in a body of water while the remaining parts of the semi-submersible platform is erected onto the second hull-assembly to complete the semi-submersible platform.

16. The method according to claim 10, wherein the first hull-assembly is constructed at a first location and transported to a second location where the second hull-assembly is assembled.

17. A method for transporting at least a first and a second underwater hull of a corresponding first and second semi-submersible platform comprising:
- a submersible underwater hull made up of at least a first and second elongated pontoon;
- at least three columns supported on and interconnected by the submersible underwater hull and protruding above the surface of the body of water when the semi-submersible platform is positioned in the body of water, wherein at least three of said columns form stabilizing buoyant columns;
- said first elongated pontoon is within two outer parts supporting and interconnecting to a lower end of two of the stabilizing columns,
- said second elongated pontoon is perpendicular to and interconnecting to said first elongated pontoon at mid-length of said first elongated pontoon,
- said second elongated pontoon is supporting and interconnecting to a lower end of a third stabilizing column at a third outer part opposite to the end interconnecting to said first elongated pontoon,
- said first and second elongated pontoons are interconnected mid-length of said first elongated pontoon so that the first and second elongated pontoons form a structure resembling the letter "T" in a horizontal plane, wherein the T-shaped structure has three ends, and
- wherein at least one of said at least three stabilizing buoyant columns is arranged at each of the three ends of the T-shaped structure,
- from a first location to a second location using a marine vessel, such as a semi-submersible dry-tow vessel, wherein each of the first and second underwater hulls is arranged with its first elongated pontoon extending in a first direction and with the second pontoon, or at least an inner part of the second elongated pontoon connected to the first elongated pontoon, extending in a second direction substantially perpendicular to the first direction, and wherein the first and second underwater hulls are directed towards each other so that the second elongated pontoon, or said part thereof, of the first underwater hull extends towards the first pontoon of the second underwater hull and vice versa.

18. The method according to claim 17, wherein the second elongated pontoon of each of the first and second underwater hulls has its full length and is connected to its corresponding first elongated pontoon, wherein the first and second underwater hulls are arranged in an offset manner, for instance in relation to the longitudinal axis of the marine vessel, and wherein the first and second underwater hulls are arranged so that the second elongated pontoon of the first underwater hull extends alongside of the second elongated pontoon of the second underwater hull.

19. The method according to claim 17, wherein the second elongated pontoon of each of the first and second underwater hulls forms two parts, wherein one of said two parts forms an inner part that is connected to its corresponding first elongated pontoon and wherein the other of said two parts forms a separate outer part, wherein the first and second underwater hulls are arranged to be substantially aligned with each other so that the inner part of the second pontoon of the first underwater hull projects towards the corresponding inner part of the second pontoon of the second underwater hull, wherein the two separate outer parts of the first and second underwater hulls are arranged on opposite sides of the two inner parts of the first and second underwater hulls.

20. The method according to claim 19, wherein the elongated pontoons and pontoon parts of the first and second underwater hulls are joined together so as to form one transport assembly with ability to float stable and upright.

21. The method according to claim 17, wherein the first and second underwater hulls are arranged in such a way that the first pontoons extend across a longitudinal axis of the marine vessel.

* * * * *